Figure 1:
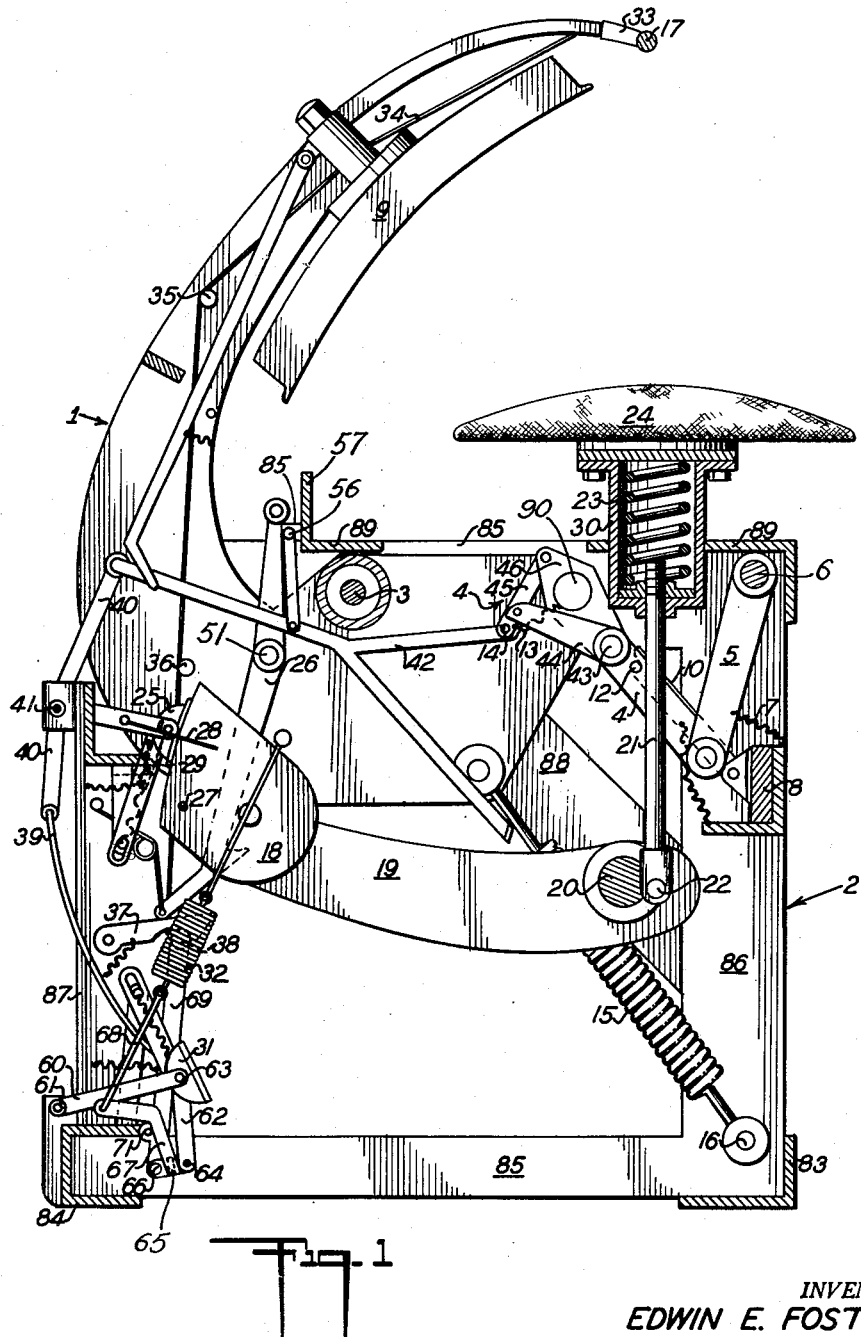

Sept. 28, 1954
J. A. BACHMANN
2,690,019
SOLVENT RECOVERY PROCESS
Filed July 11, 1950
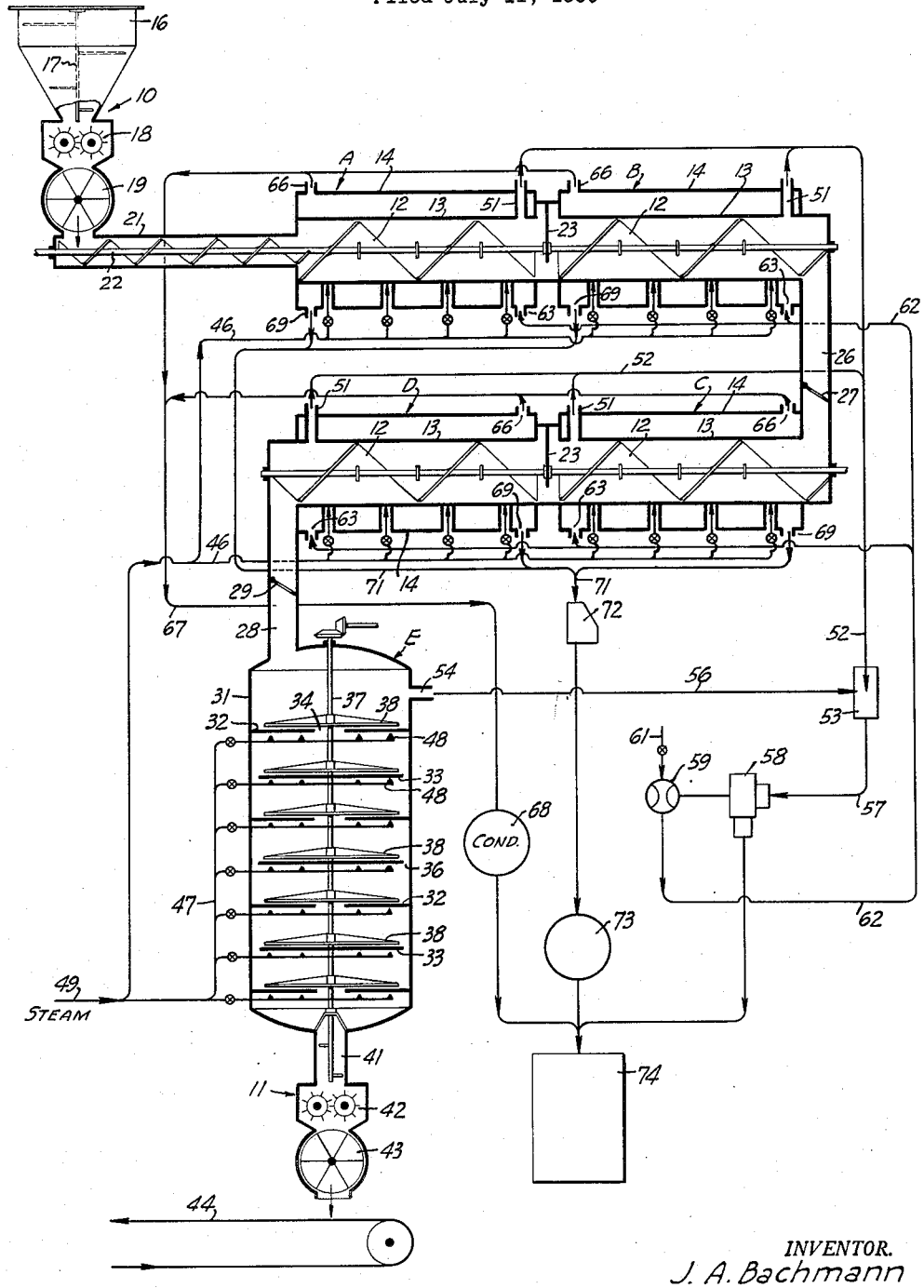
INVENTOR.
J. A. Bachmann
BY
ATTORNEYS Patented Sept. 28, 1954

2,690,019

UNITED STATES PATENT OFFICE 2,690,019

SOLVENT RECOVERY PROCESS

Jakob August Bachmann, Sausalito, Calif., assignor of one-fourth to Flehr and Swain, a copartnership Application July 11, 1950, Serial No. 173,052

3 Claims. (Cl. 34—35)

This invention relates generally to processes for the recovery of solvents or like volatile materials from various products containing the same, and to apparatus useful in such processes.

There are many commercial processes which produce by-products or residues containing solvents or like volatile components. In some instances the character of such products is such that the solvents are not readily recoverable by the usual distillation or leaching processes, or the expense of applying such processes may approach or even overbalance the value of the recoverable solvents. For example in the wine and brandy industry the by-product known as "pomace" has a substantial content of volatile alcohol. While it is possible to recover a portion of the alcohol by reslurrying the pomace followed by distillation or by separation and distillation, such methods are relatively expensive and do not make possible substantially complete recovery.

In addition to pomace produced in the wine and brandy industry, there are other industrial processes in which a divided solid material remains as a by-product or waste residue after the main processing operations, and which contain solvents or like volatile components. The solids of such materials may range in particle size from relatively fine powders, through the larger granular sizes. Particular reference can be made to such particles as sand, sawdust, cereal grain, vegetable meals, brewery and winery wastes, and the like. Many of these solids may display a moist and sticky appearance, although in general they can be readily handled by apparatus such as screw conveyors, scraper conveyors, etc. The solvent or volatile components to be removed are generally homogeneously distributed throughout the particles. In some instances the divided material containing the solvent may be superficially dry, and in the form of a relatively loose and friable mass. In other instances the material may appear to be moist or wet, particularly if a part of a volatile component or a liquid containing the same is visibly present upon the surfaces of the particles. While it may be possible to process such by-products or residues by conventional methods, the cost of such reworking is often too high in relation to the value of the solvent recovered. In addition further distillation or other conventional reworking may be precluded due to destructive breakdown of the material under such treatment.

In general it is an object of the present invention to provide a novel and desirable process for the recovery of solvents and like volatile components from industrial by-products or residues of the type referred to above.

It is another object of the invention to provide a process of the above character which is particularly applicable to the treatment of divided materials, and particularly materials which cannot be economically or advantageously processed by conventional methods.

Another object of the invention is to provide novel apparatus suitable for carrying out the present process.

Additional objects and features of the invention will appear from the following description in which the preferred embodiment has been set forth in detail in conjunction with the accompanying drawing.

In general the process of the present invention treats the solvent containing material in a series of separate and successive stages. The material is heated to provide an increasing temperature gradient and to cause effective vaporization of the solvent in the successive stages. In conjunction with the separate treatment stages, I employ a vapor recompression cycle which makes possible relatively efficient utilization of heat.

The details of my process can best be understood after a description of the apparatus illustrated in the drawing. This apparatus consists of a plurality of treatment units A, B, C, D and E, which are connected together for the progressive treatment of the material in stages. Suitable feed means 10 serves to supply divided material to the first treatment unit A, and the discharge means 11 serves to remove the spent divided material from the last stage E. The feed and discharge means are vapor sealed and likewise a vapor blocking or isolating means is provided between each of the treatment units. Each of the units A, B, C, D and E is constructed to enable transfer of heat to the divided material, and for the removal of volatilized solvent. Likewise it is desirable that each unit include means for continually agitating the divided material, and for progressively exposing the particles to the surfaces of the mass.

In the particular apparatus illustrated in the drawing, the units A, B, C and D are similar in construction. The units A and B are disposed end to end for continuous progression of material from one stage to the next, and units C and D are similarly related to each other, but disposed at a lower level.

The unit A as illustrated consists of a feed screw 12, disposed in the tubular shell 13, and adapted to be continuously rotated to progress the divided material through the shell 13 with continuous agitation. Surrounding the shell 13 there is a heating jacket 14, which is adapted to be supplied with vapor and steam.

The feed means 10 which supplies divided material to the first unit A can consist of a feed hopper 16, which is provided with the agitator 17. From the hopper 16 the material passes downwardly through the shredder 18, and then through the rotary valve or other suitable vapor lock 19 to the conveyor tube 21. The conveyor screw 22 within the tube 21 can be an extension of the conveyor screw 12 of unit A as illustrated. Likewise the tube 21 connects to deliver material to one end of the shell 13.

The units B, C and D, can be constructed the same as unit A. The two conveyor screws 12 of units A and B can be directly connected as illustrated. Suitable vapor blocking means such as a vapor curtain 23, is shown interposed between these units, whereby material may pass from one unit to the next through the restricted passage below the curtain 23, without substantial direct flow of vapor from one unit to the next.

As means for transferring the divided material from the unit B to unit C, I have shown a conduit 26 which connects at its upper end with the discharge end of shell 13 for unit B, and connects at its lower end with the inlet end of the shell 13 for unit C. Suitable vapor blocking means is provided in this conduit, such as a flap type valve 27, which permits passage of divided material but blocks flow of vapor. The material progresses through the units D and C the same as through the units A and B. A vapor curtain 23 is provided between these units, the same as between units A and B.

The discharge end of the unit D delivers material into the depending conduit 28, which is equipped with a flap valve 29 or other suitable vapor blocking means, the same as the conduit 26.

The unit E as illustrated consists of a chamber 31 which is equipped with a plurality of vertically spaced shelves 32 and 33. The shelves 32 are provided with central openings 34, and the shelves 33 are supported and dimensioned to provide annular passages 36 about their peripheries. A rotatable shaft 37 extends centrally through the chamber 31, and carries the radially extending rakes 38, which operate over the shelves 32 and 33. Divided material introduced into the chamber 31 through the conduit 28 drops upon the uppermost shelf 32, where it is progressively agitated and continually moved inwardly for continuous discharge through the opening 34. The material drops upon the next shelf 33, where it is acted upon by the rakes 38, to continuously agitate and urge the material outwardly for discharge through the opening 36. The material is thus caused to progressively cascade downwardly from one shelf to the next, and while upon the shelves there is a continual turning over of the material with continuous agitation for optimum release of vapor.

The discharge means 41 can consist of a conduit 41 which connects with the lower end of the chamber 31, and which delivers the material to the rotary shredder 42. From the shredder the material passes through the rotary valve 43 or like vapor lock, to be finally delivered to a conveyor 44 or like means for its removal.

Various means is provided for supplying a controlled amount of heat to each of the units, in addition to the heat supplied to certain of the units by the recompression of vapor cycle to be presently described. Thus electrical, steam, hot gas, or other suitable heating means is provided to supply heat to the shells 13 of the units A, B, C and D, or to the flights of the conveyor screws 12, or to both the shells and the screw flights. Likewise suitable heating means is provided for supplying heat to the shelves 32 and 33 of the unit E and to the atmosphere maintained within the chamber 31. As suitable means for such heating, I have shown steam supply pipes 46 which have valve controlled connections with the interior of the shells 13. For the unit E I have shown a steam supply pipe 47 which is connected to the perforated headers 48, located below the shelves 32 and 33, and adapted to discharge jets of steam upon the lower sides of these shelves. Pipes 46 and 47 connect with a common steam supply pipe 49 as illustrated. Direct injection of steam as just described is particularly desirable in that such steam not only supplies heat but in addition provides a vehicle for the evolved solvent vapor.

The vapor recompression cycle can employ vapor connections and auxiliary equipment as follows: Each one of the shells 13 for the units A, B, C and D is provided with a vapor outlet 51 near its discharge end. All of these outlets connect with a common vapor line 52, which leads to the vapor mixer 53. The chamber 31 for unit E has a vapor outlet 54, which is connected by line 56 to the same vapor mixer 53. Line 57 delivers vapor from the mixer 53, through the condensate entrainment trap 58, to the vapor recompressor 59. The vapor recompressor 59 can be of the mechanical or steam jet type. If of the steam jet type, it is provided with a steam line connection 61. Line 62 conveys recompressed vapor from 59 to the units A, B, C and D. Thus the jackets 14 of each of these units is provided with an inlet 63, which connects with the vapor line 62.

The upper sides of the jackets 14 are shown provided with vapor outlets 66, which are connected to the common vapor line 67 leading to the condenser 68. The lower sides of the jacket 14 are shown provided with condensate removal outlets 69, which are connected to the common condensate line 71, leading to the steam trap 72. Condensate from trap 72 is shown passing through a heat exchanger 73 for recovering a part of its heat content before being delivered to the receiver 74. Condensed vapor from the trap 58 and from the condenser 68 are also shown being delivered to the receiver 74.

Suitable heat insulation (not shown) is provided for the exterior surfaces of each of the units and for the conduits 26 and 28. This likewise applies to the external piping employed to conduct vapor and steam and to heated parts of the auxiliary equipment from which serious heat loss may occur.

The general operation of the apparatus described above is as follows: The divided material from which solvent is to be removed is supplied to the hopper 16, and from there passes through the shredder 18, the rotary valve 19 to the feed screw 22, and from thence it is continuously delivered to the first unit A, from which it proceeds successively through the units B, C, D and E. Assuming that the apparatus has reached equilibrium in its operation, with continuous supply of divided material and continuous discharge of spent material from the unit E, the material is heated progressively in the successive stages to temperatures such as to cause continuous volatilization of solvent. Heating in each of the stages A, B, C and D is by virtue of heat from directly injected steam introduced by way of line 49, together with heat recovered from recompressed vapor introduced by way of line 62. Vaporized solvent evolved in each of the units A, B, C and D is collected and recompressed, and recompressed vapor is supplied to the jackets of units A, B, C and D. The divided material is subjected to a rising temperature gradient, with the maximum treatment temperature being attained in the unit E. In unit E the material is heated by direct transfer of heat from the shelves 32 and 33, upon which the material is deposited, and in addition the material is heated by virtue of being in a hot atmosphere of steam and solvent vapor. Vapor removed by way of line 56 from unit E has a substantial heat content, and a substantial part of this heat content is utilized in the recompression cycle, together with the heat of the vapors arising within shells 13, for supplying heat to the units A, B, C and D. Vapor condenses in the jackets 14 and/or the condenser 68 and collects in the receiver 74. Each unit is generally isolated from the succeeding unit by vapor blocking means as previously described, thus making possible selective routing of vapor in the recompression cycle.

All of the units can be operated at or near atmospheric pressure. The vapor recompressor tends to maintain a slight suction on its intake side, which promotes continuous vapor removal from each of the units. This also facilitates effective blocking of vapors between units without the use of more elaborate vapor seals.

Previous reference has been made to the use of my process for the recovery of solvent from by-product pomace which is produced in the wine and brandy industry. What is commonly referred to as "once-washed and pressed pomace" is a typical form of by-product material produced in California winery operations. When the grapes have been crushed to express the grape juice, soaked in water, subjected to a second fermentation to produce a second or press wine, and then again pressed, the final residue is the "once-washed and pressed pomace." In a typical instance such pomace contains about 60% liquids and 40% solids. The liquid content has essentially the same composition as the press wine, and permeates the 40% solids. The solids originate from the skins, seeds, short stems and pulp solids of the twice processed grapes. The liquid remaining with the solid residue usually has an alcohol content of about 9° proof, or about 4½% by volume. In a typical winery having a capacity of from 15 to 22 tons of grapes per hour, the amount of pomace averages about 2 tons per hour, and the recoverable alcohol amounts to about 20 to 40 proof gallons per hour. Assuming that this alcohol is worth from 75¢ to $1.25 per proof gallon, the value of the recoverable alcohol for such a plant ranges from $15.00 to $50.00 per hour.

My process and apparatus is well adapted to the recovery of alcohol from pomace of the type described above. By way of example, and not by way of limitation, the pomace may be supplied to the unit A at a temperature of about 77° F., and in this unit the temperature may be increased to about 130° F. In units B, C and D the temperature of the pomace can be further increased to 165° F., 190° F. and 205° F. respectively. A further temperature increase takes place in unit E whereby the spent pomace is delivered through conduit 42 at about 212° F.

About 97% or more of the total alcohol content of the pomace can be recovered by use of the process. The total heat consumption required is relatively low compared with conventional processes which have been used or proposed for the treatment of pomace. This is attributed to the treatment in successive stages in conjunction with the vapor recompression cycle.

It will be evident that the present invention is not confined to the specific type of apparatus illustrated in the drawing. Various types of equipment can be used for the successive treatment stages, and as previously mentioned, various methods can be used for supplying heat to the material in the several stages, as for example electrical heating, heating with hot gas, steam or vapor heating and the like. While the units A, B, C and D as illustrated employ flow of heating vapor counter-current and flow of steam concurrent to progression of material being treated, other modes can be selected in different specific cases. This likewise applies to flow of steam and vapor in unit E.

Although in many instances the vapor curtains 23 can be rigid walls serving as obstructions and below which the material must pass from one stage to the next, where a sharper isolation of evolved vapors is desired, more elaborate blocking means can be used, such as adjustable flaps to further block the spaces below these curtains. Such flaps can be made of sheets of rubber, cloth or the like, and carried by metal parts adjustable from the exterior of the units. It is also possible to utilize rotary vapor lock valves in place of the curtains 23, such as devices similar to the valves 19 and 43.

The means employed for progressing the material through the various units can be modified to suit particular materials. Thus for moist sticky material like grape pomace, helicoidal ribbon conveyors are more suitable than the screw conveyors illustrated.

While the apparatus described above incorporates a single recompressor 59, it is possible to secure somewhat higher efficiency by incorporating two vapor recompression operations. The second recompression operation can be applied to the vapors removed by way of line 67, with the recompressed vapors being merged with line 52, or separately returned to the stages A, B, C and D. If desired such a second recompression operation can be applied only when the recompressed vapors supplied by the compressor 59 are not sufficient for proper heating of the stages A, B, C and D.

It will be evident that the process is not critical with respect to the number of stages employed. Thus in some instances it may be desirable to increase the number of stages. For example, a plant of substantial capacity for the recovery of alcohol from grape pomace may have from five to eight units preceding the unit E. In other instances I can employ a lesser number of treatment units than as illustrated. In general the number of units employed is dependent upon such factors as capacity, the character of the material being treated, the solvent content of the material, the boiling point of the solvent, and the first cost versus the operating economy desired.

In the apparatus as illustrated, all of the vapor evolved in units A, B, C and D is merged for delivery to the recompressor 59, and likewise all of the condensate from these units is merged for delivery to the heat exchanger 73 and receiver 74. It will be evident that with certain materials it may be desirable to isolate the vapors recovered on one or more of the units, thus permitting the removal and recovery of a volatile fraction which differs from a volatile fraction being evolved in another stage.

My process and apparatus is applicable to treatment of a wide variety of materials containing volatile components. For example, it can be Sept. 28, 1954     E. E. FOSTER     2,690,020
LAUNDRY PRESS Filed June 8, 1949     6 Sheets-Sheet 1

INVENTOR.
EDWIN E. FOSTER
BY
Young, Emery & Thompson
ATTORNEYS